INVENTORS
Richard J. Bauer &
Gary L. Gass
BY Robert L. Spencer
ATTORNEY

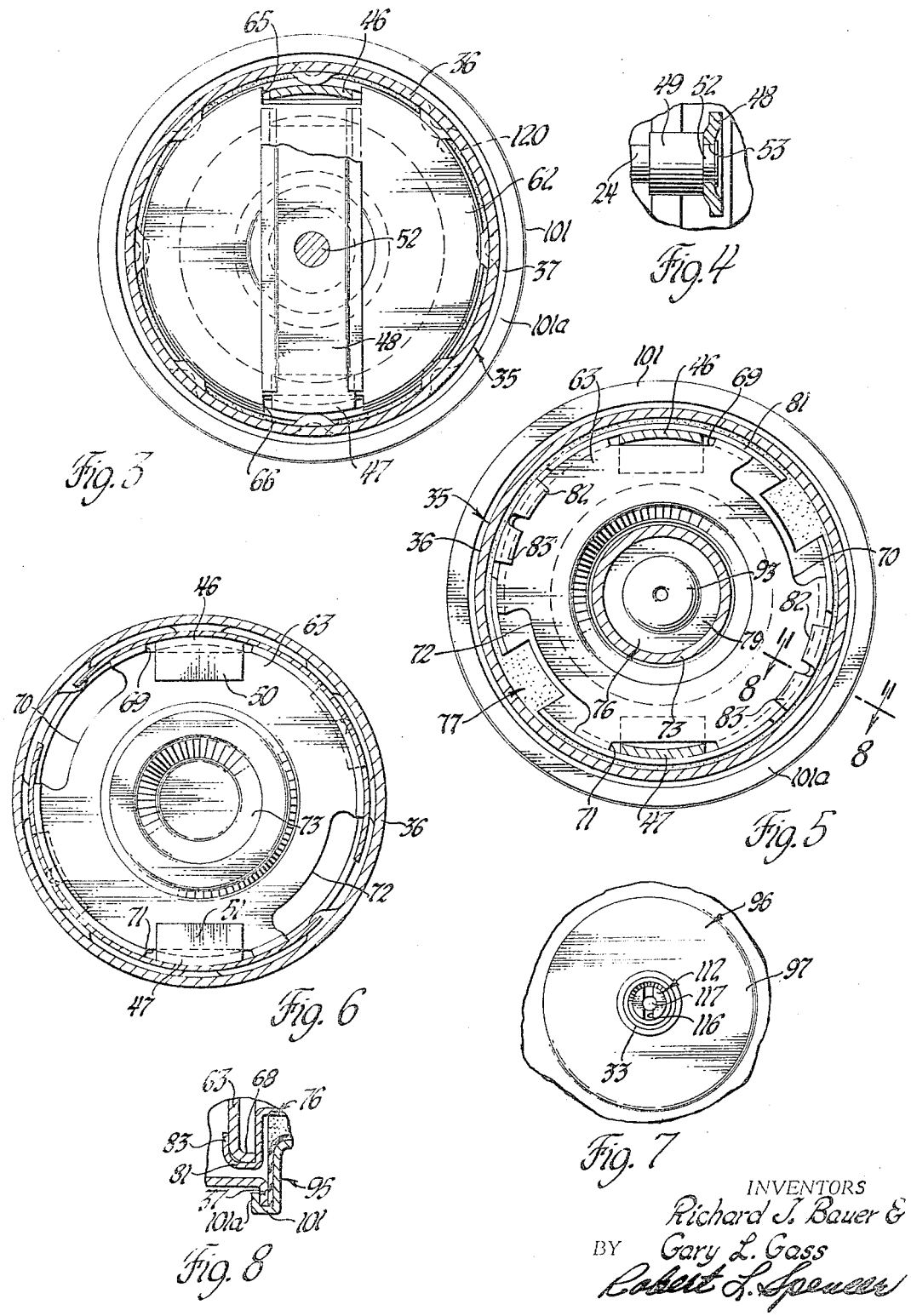

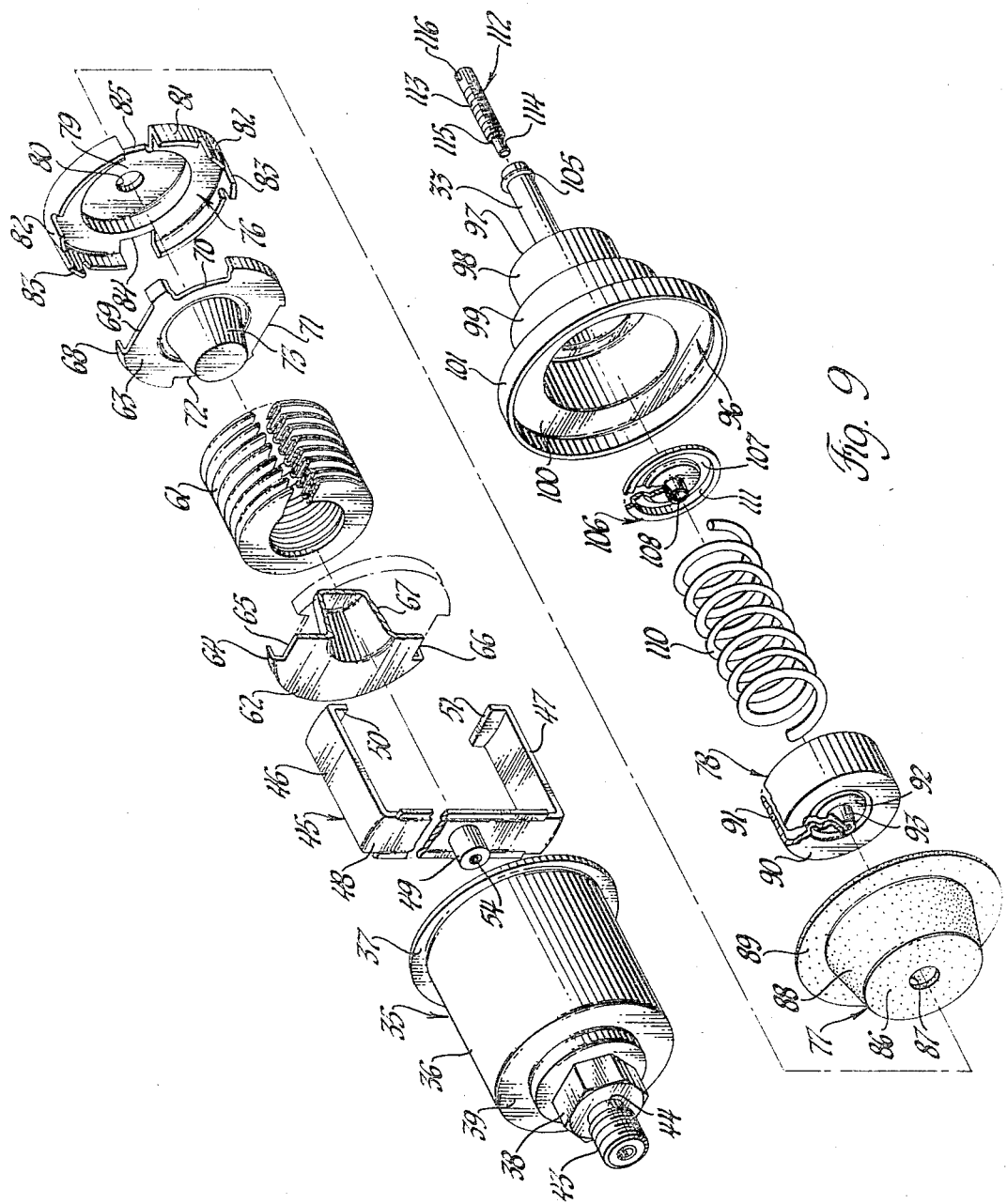

United States Patent Office 3,302,534
Patented Feb. 7, 1967

3,302,534
VACUUM MODULATOR
Richard J. Bauer, Davison, and Gary L. Gass, Flint, Mich., assignors to General Motors Corporation, Detroit, Mich., a corporation of Delaware
Filed Sept. 17, 1965, Ser. No. 488,045
3 Claims. (Cl. 92—36)

This invention relates to vacuum modulators and more particularly to an improved vacuum modulator assembly made up of a series of subassemblies and which is relatively inexpensive to manufacture. These subassemblies are designed for simple inexpensive assembly as subassemblies and for final assembly into the complete assembly without the use of any additional fasteners, thereby facilitating the ease of final assembly and further reducing costs. An additional feature of the improved modulator is the provision of improved calibrating means for calibrating the modulator and including a calibrating screw which functions both to calibrate the effective force of a calibrating spring and as a passage whereby control vacuum is admitted to the modulator. A further feature of this invention is the provision of an actuating yoke having spaced arms passing through recesses in bellows end plates and having fingers gripping one end plate and a diaphragm assembly having a diaphragm connector having fingers grippings the bellows end plate on the side of the plate opposite the yoke fingers whereby the diaphragm assembly, yoke assembly and bellows end plate are joined for movement as a unit. A further feature is the structure whereby a flange on one bellows end plate is contained within a flange on the diaphragm connector to facilitate assembly. An additional features is the manner in which a fixed end plate of the bellows is provided with a flange held against axial movement by pressed in bosses on the lower case assembly and disposed in the path of travel of the fixed bellows end plate.

These and other features and advantages of this invention will be apparent from the following specification taken in conjunction with the accompanying drawings, in which:

FIGURE 3 is a sectional view taken along the line 3—3 of FIGURE 2.

FIGURE 4 is a sectional view taken along the line 4—4 of FIGURE 2.

FIGURE 5 is a sectional view taken along the line 5—5 of FIGURE 2.

FIGURE 6 is a sectional view taken along the line 6—6 of FIGURE 2.

FIGURE 7 is an end view taken along the line 7—7 of FIGURE 2.

FIGURE 8 is a sectional view taken along the line 8—8 of FIGURE 5.

FIGURE 9 is an exploded perspective view of the parts required for the complete assembly.

Figure 1:
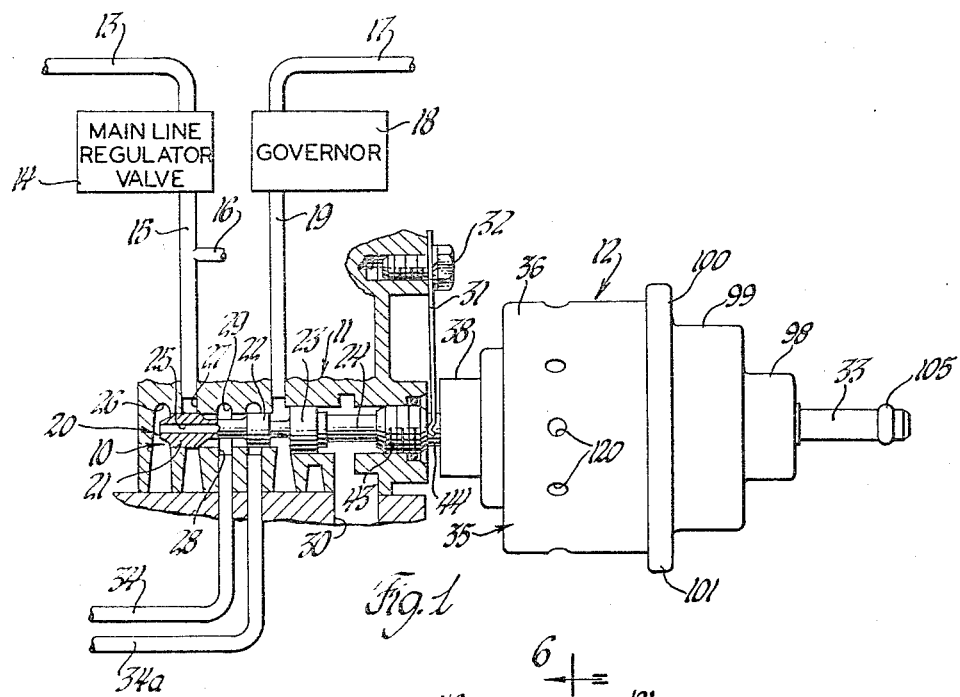
FIGURE 1 is a drawing of a modulator incorporating the principles of this invention and particularly applied to a pressure metering valve, the valve body being shown in longitudinal section.

In FIGURE 1 there is shown a pressure metering valve 10 axially movable in a valve body 11 and adapted to be controlled by a vacuum modulator indicated generally at 12 and constructed in accordance with the teachings of this invention.

A transmission pump (not shown) is adapted to supply fluid under pressure to a passage 13 and through a line pressure regulator valve 14 to a passage 15. Regulated pressure in passage 15 is delivered to valve body 11, and to a branch passage 16. Branch passage 16 is connected to a governor pressure supply passage 17 and may also be connected to a transmission (not shown) for lubrication purposes. A vehicle speed responsive governor 18 is adapted to deliver variable pressure to valve body 11 through a passage 19. The governor may be of conventional construction such that the pressure in passage 19 increases with increase in vehicle speed and decreases with decrease in vehicle speed.

A valve 20 provided with lands 21, 22, 23 and a stem 24 is axially movable in valve body 11. A passage 25 through land 21 connects a chamber 26 at one end of land 21 to the base of the valve body intermediate lands 21 and 22. Line pressure supply passage 15 terminates in a port 27. Port 28 is a modulator pressure delivery port connected to a modulator pressure delivery passage 34. Port 29 is an exhaust port connected to an exhaust passage 34a. Port 30 admits governor pressure to the valve bore intermediate lands 22 and 23. Port 30 is an exhaust port. Modulator 12 may be screw threaded into valve body 11 and retained therein by a leaf spring retainer 31 bolted to the valve body by a bolt 32. Land 23 is of greater diameter than land 22 such that governor pressure biases the valve 10 towards the right as viewed in the drawing to reduce the modulator pressure delivered by the valve as the vehicle speed increases. Also, modulator pressure conducted to chamber 26 acts on land 21 to bias the valve towards its cut off position. A nipple 33 is connected to the engine manifold as a source of vacuum by a conventional hose, not shown.

Figure 2:
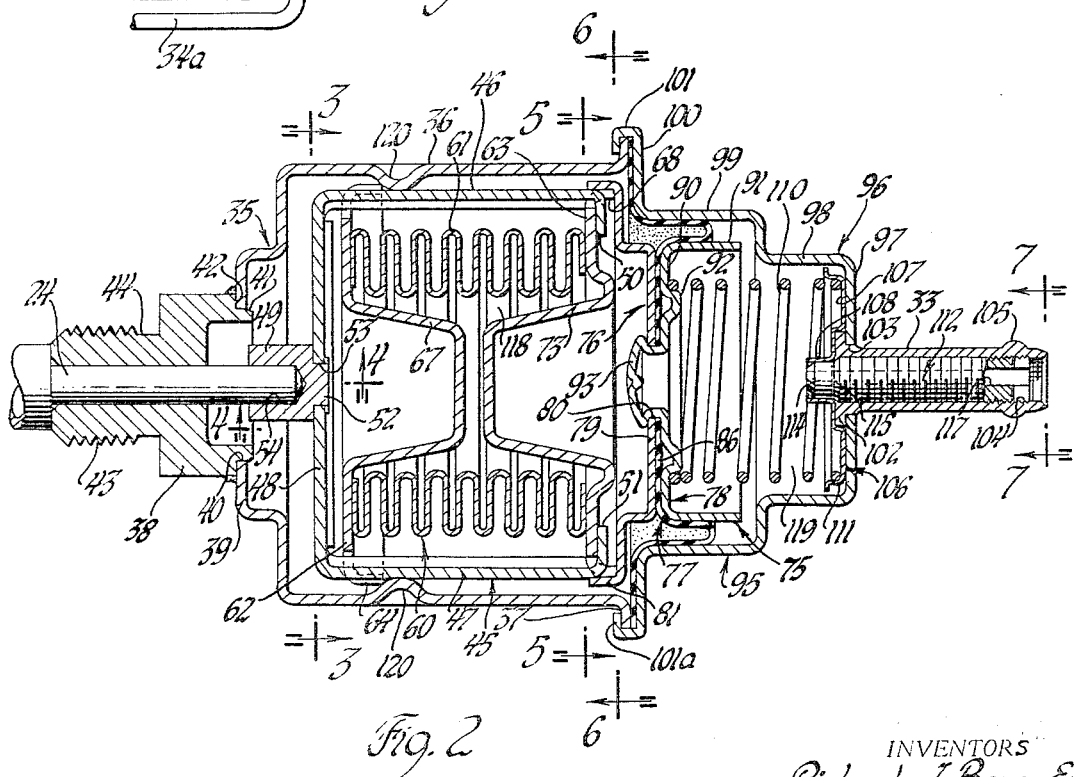
FIGURE 2 is a longitudinal section of the modulator shown in FIGURE 1.

As best shown in FIGURES 2 and 9, the vacuum modulator is made up of a plurality of subassemblies for simplicity and low cost of manufacture and assembly. A lower case assembly indicated generally at 35 includes an outer generally cylindrical case 36 having an upstanding flange 37 formed at one end thereof and a threaded adapter 38 brazed to an end wall 39 at one end of the outer case. End wall 39 has an opening 40 therein for receiving a reduced section 41 of adapter 38 such that adapter 38 presents a shoulder 42 in contact with the outer surface end wall 39 of case 36 to facilitate assembly of adapter 38 to case 36, by limiting the depth to which the adapter may be inserted into end wall 39. Flange 37 is an annular flange for purposes hereinafter explained. A series of threads 43 on adapter 38 are screw threaded into valve body 11 of FIGURE 1. Retainer 31 of FIGURE 1 extends into an annular recess 44 on adapter 38 to retain the lower cover and valve body in assembled relationship.

A yoke assembly indicated generally at 45 in FIGURES 2 and 9 includes a yoke having spaced arms 46 and 47 joined by a base 48 and a guide 49 secured to base 48. Fingers 50 and 51 are formed on arms 46 and 47, respectively. Guide 49 is secured to base 48 by inserting a reduced portion 52 thereon through an opening 53 in base 48 and peening the surface of portion 52 into contact with base 48 on the side of the base opposite the guide 49, as best shown in FIGURE 4. A recess 54 (see FIGURE 2) in guide 49 is adapted to receive the stem 24 of valve 10.

As best shown in FIGURES 2 and 9, a bellows assembly 60 includes a bellows 61 and a pair of end plates 62 and 63, bonded to the opposite ends of the bellows. End plate 62 is provided with a flange 64 bent at right angles to the plate 62 and with a pair of recesses 65 and 66 at its outer periphery adapted to receive arms 46 and 47 of yoke 45. The recesses permit yoke arms 46 and 47 to move axially with respect to end plate 62 without interference from the end plate. Plate 62 is stamped to form a generally cone-shaped stop member 67 extending axially into bellows 61. End plate 63 has formed thereon a flange 68 extending perpendicular to plate 63. Four recesses 69, 70, 71, 72 are formed in the periphery of flange 68 and a stop member 73 of cone shape is stamped from end plate 63. End plates 62, 63 are bonded to the opposite ends of bellows 61 to form a closed chamber adapted to be evacuated.

A diaphragm assembly indicated generally at 75 includes a connecting protector 76, a diaphragm 77 and a diaphragm protector 78. Connecting protector 76 is stamped to form a base 79 having a central opening 80 therethrough and a rim 81 extending perpendicular to base 79. Two sets of fingers 82, 83, best shown in FIGURE 9, extend axially beyond the normal axial dimension of rim 81. Recesses 84 and 85 are provided in rim 81. Diaphragm 77 includes a base 86 having a central opening 87 therethrough, and an upstanding rim 89 joined to base 86 by a conical shaped section 88. Diaphragm protector 78 includes a base 90 having a cylindrical rim 91 extending from the base. Base 90 is stamped to provide an axially extending annular boss 92 (FIG. 2) extending in the direction of rim 91 and a nipple 93 extending axially from the base 90 in a direction opposite from rim 91. In assembling the diaphragm assembly, nipple 93 is inserted through openings 87 and 80 of diaphragm 77 and connecting protector 76 and is upset as best shown in FIGURE 2 to join these parts into an air tight subassembly.

An upper cover or case assembly indicated generally at 95 includes an upper cover 96 having a base 97, stepped cylindrical portions 98, 99 and an axially extending rim 101 formed on and connected to cylindrical portion 99 by a flange 100. A nipple 33 provided with a head 102 thereon is inserted through a central opening 103 in base 97 and is brazed to base 97 to form an air tight juncture of the sleeve and upper cover. Nipple 33 is internally threaded at 104 and is provided with an external annular boss 105 to receive a flexible hose (not shown).

A spring seat 106 is shaped to provide a generally cup-shaped base 107 and an axially extending hollow boss 108. A calibrating spring 110 seats upon diaphragm protector 78 and upon spring seat 106 and is retained in position by boss 92 on protector 78 and an axially extending rim 111 on spring seat 106.

A calibrating screw 112 is provided with external threads 113 coacting with threads 104 of nipple 33, an end extension 114 of reduced diameter and a shoulder 115 between extension 114 and the threaded portion 113. Screw 112 is slotted at 116, as best shown in FIGURES 7 and 9, for ready adjustment relative to nipple 33 as by means of a screw driver. Shoulder 115 contacts the base of boss 108 of spring seat 106 such that the position of seat 106 may be moved axially relative to upper cover 95 by turning screw 112 in nipple 33. A passage 117 best shown in FIGURES 2 and 7 extends axially through the center of screw 112.

In FIGURE 3, lower case 36 is shown as being staked inwardly to form eight inwardly projecting stop members 120 equally spaced around the circumference and in alignment with the bent over flange 64 of bellows end plate 62. The eight stop members lie in a common plane and prevent movement of end plate 62 to the right as viewed in FIGURE 2. Arms 46 and 47 of the yoke extend through slots 65 and 66 of end plate 62 for axial movement and are not restricted in their motion by stop members 120.

In FIGURE 4 the guide 49 is shown as secured to base 48 of the yoke by forming a head 53 to grip the base in the manner of a rivet.

FIGURE 5 illustrates the manner in which the diaphragm connector 76 connects to end plate 63. As shown, both sets of fingers 82, 83 are bent at right angles to the axially extending rim 81 of diaphragm connector 76 into contact with the wall of end plate 63 on the side of plate 63 adjacent bellows 61. In assembling the diaphragm connector 76 to the bellows end plates 63, recesses 84 and 85 of the diaphragm connector are aligned with slots 70 and 72 of bellows end plate 63 and fingers 82 and 83 are bent at right angles over the end plate 63.

Slots 70 and 72 and recesses 84 and 85 are aligned as shown in FIGURE 5 to permit a calibration tool to pass through these recesses in order to position the bellows end plate 62 to a proper desired position in the lower case assembly 35.

As shown in FIGURE 8, rim 101 of upper housing cover 95 is crimped over at 101a to grip flange 37 on lower housing cover 36 to assemble these two subassemblies to each other. In FIGURE 7, passage 117 in calibrating screw 112 is shown extending entirely through the central portion of screw 112 and throughout the length of the screw. Also shown is slot 116 in the end of the screw.

It will be apparent from the foregoing that guide 49, yoke 48, end plate 63, diaphragm connector 76, diaphragm 77 and diaphragm protector 78 all move as a unit. Bellows 61 and end plates 62 and 63 enclose an evacuated chamber 118. Bellows 61 therefore tends to move yoke 48 and guide 49 toward the left as viewed in FIGURE 2 to apply a force to valve 10 tending to move valve 10 towards the left to increase the pressure delivered to passage 34 by valve 10. Stop members 67 and 73 may contact each other to limit the permissible range of motion of end plate 63 towards end plate 62. Upper cover 95 and diaphragm 77 form a second chamber 119 adapted to be connected to a source of variable vacuum such as an internal combustion fuel intake manifold through passage 117 in calibrating screw 112 and a hose (not shown). Engine manifold vacuum in chamber 119 acting on diaphragm 77 tends to pull the connector 76 and yoke 48 to the right as viewed in FIGURE 2 to reduce the pressure delivered to passage 34 by valve 10 of FIGURE 1. Also in FIGURE 1, modulator pressure in passage 34 exists in chamber 26 and tends to reduce the pressure delivered by the valve. In addition, governor pressure in the space between lands 22 and 23 acts on the differential area of the lands to bias the valve to reduce the pressure delivered to passage 34. The primary force tending to move the valve to the left as viewed in FIGURE 1 or towards a position to increase the pressure in passage 34 is that of evacuated bellows 61. It will be apparent that vacuum in chamber 119 will be maximum at closed engine throttle and the effective vacuum in chamber 119 will decrease as the engine throttle is opened in response to increase in engine torque demand. Modulator pressure will be minimum with the vehicle stopped and the engine idling at closed throttle. Modulator pressure in passage 34 will be maximum at wide open throttle and low vehicle speed. Governor pressure which increases with increase in vehicle speed decreases modulator pressure with increase in vehicle speed. The arrangement of calibrating screw 112 in nipple 33 permits proper calibration of the device while making possible the admission of vacuum into chamber 119 through passage 117 in calibrating screw 112. The arrangement of the subassemblies and the manner in which they are assembled to each other in the final assembly, particularly the manner in which the diaphragm connector and yoke are assembled to end plate 73, are believed to be novel.

We claim:
1. A vacuum modulator assembly composed of an assembly of five subassemblies including lower case, yoke, bellows, diaphragm and upper case subassemblies, respectively, said lower case subassembly comprising a lower case of generally cylindrical configuration having an adapter secured to an end wall of said lower case, an opening through said adapter for receiving mechanism to be controlled by said modulator, said yoke assembly comprising a generally U-shaped yoke having a base and a pair of spaced arms extending from said base, a guide secured to said base, said mechanism to be controlled including axially movable means extending through said adapter opening into contact with said guide, said yoke assembly comprising a bellows and first and second end plates secured to said bellows and forming with said bellows an evacuated chamber within said bellows, said diaphragm subassembly comprising a diaphragm protector, a diaphragm and a diaphragm connector assembled to each other, said upper case subassembly including a generally cylindrical shaped upper case and a hollow nipple secured to one end of said case, means on said lower case coacting with said first bellows end plate for preventing axial movement of said first end plate relative to said lower case, said yoke arms extending parallel to said bellows and gripping said second end plate, said diaphragm connector including a flange gripping said second end plate, said upper case being secured to said lower case and gripping the periphery of said diaphragm between said lower and upper cases such that said diaphragm and upper case form a second chamber adapted to be connected to a source of variable vacuum, said diaphragm assembly, said yoke and said second bellows end plate being movable as a unit, a spring seat disposed in said second chamber, a calibrating spring acting upon said diaphragm protector, adjustable mechanism in said hollow nipple and contacting said spring seat for varying the effective force of said calibrating spring, and a passage through said adjustable mechanism for admitting vacuum from said vacuum source to said second chamber.

2. A vacuum modulator assembly composed of an assembly of a plurality of subassemblies, said subassemblies including lower case, yoke, bellows, diaphragm and upper case subassemblies, respectively, said lower case subassembly comprising a lower case having an end wall and an adapter secured to said end wall, an opening through said adapter for receiving mechanism to be controlled, said yoke subassembly comprising a generally U-shaped yoke having a pair of spaced arms extending from the base of said yoke and a guide member secured to said yoke base, said mechanism to be controlled having a member extending through said adapter opening for contacting said guide, said bellows assembly including a bellows and first and second end plates secured to said bellows to form an evacuated chamber within said bellows, said end plates comprising generally disc shaped members of greater diameter than the diameter of said bellows, said first disc having a flange thereon for contacting said lower case, means on said lower case contacting said first end plate flange for retaining said first end plate in a fixed position with respect to said lower case, recesses on the periphery of said first end plate, said yoke arms extending through said recesses, respectively, for axial movement with respect to said lower case, recesses in the periphery of said second bellows end plate for receiving said yoke arms, respectively, said yoke arms extending through said recesses, respectively, a finger on each of said yoke arms gripping said second end plate on the side of said end plate remote from said bellows, said diaphragm subassembly comprising a generally cylindrical shaped diaphragm protector, a diaphragm connector and a diaphragm assembled together as a subassembly, a rim on said second bellows end plate contacting said diaphragm protector at the base of said diaphragm protector rim, fingers on said diaphragm connector gripping said second bellows end plate on the side of said plate adjacent said bellows, said second bellows end plate, said diaphragm connector and said yoke being thereby assembled to each other for movement as a unit with respect to said lower case, said upper case subassembly including a generally cup-shaped upper case having a hollow nipple extending outwardly from the base of said upper case, coacting flanges on said upper and lower cases, respectively, for retaining said upper and lower case in assembled relationship, said diaphragm at its periphery being gripped between said upper and lower case and forming with said upper case a second chamber adapted to be connected to a source of variable vacuum, a spring seat in said second chamber, a calibrating spring between said spring seat and said diaphragm protector, an adjustable member in said hollow nipple adapted to be moved axially in said nipple, said adjustable member contacting said spring seat for varying the position of said spring seat in response to movement of said adjustable member to thereby vary the force effect of said calibrating spring on said diaphragm protector, and a passage through said adjustable member adapted to be connected to said vacuum source for connecting said second chamber to said vacuum source.

3. A vacuum modulator assembly composed of an assembly of a plurality of subassemblies including lower case, yoke, bellows, diaphragm and upper case subassemblies, respectively, said lower case subassembly comprising a generally cup-shaped lower case and an adapter secured to the base of said cup, an opening through said adapter, an upstanding flange formed on the rim of said cup, said yoke assembly comprising a generally U-shaped member having a pair of spaced arms extending outwardly from its base and a guide member secured to said base, inwardly depending fingers formed on each of said arms, axially movable mechanism adapted to be operated by said modulator having a member extending through said adapter into contact with said guide member for movement by said guide member, said bellows assembly including a bellows and first and second end plates fixed to said bellows for forming an evacuated chamber within said bellows, said end plates extending outwardly beyond said bellows, a flange on said first end plate contacting said lower case, a series of inwardly projecting stop members on said lower case contacting said first end plate flange for retaining said first end plate in fixed relationship with respect to said lower case, spaced recesses on said end plates, respectively, said yoke arms extending through said recesses, respectively, and said fingers on said yoke arms gripping said second end plate on the side of said plate remote from said bellows, an axially extending flange on said second end plate, said diaphragm assembly including a diaphragm having a central opening therein, a diaphragm connector having a central opening therein and a diaphragm protector, an axially extending nipple on said diaphragm protector, said diaphragm having a portion thereof disposed between said diaphragm connector and said diaphragm protector, said nipple extending through both of said last-mentioned openings and extending outwardly on the side of said diaphragm protector remote from said diaphragm, said nipple being pressed into contact with said protector to permanently join said protector, said diaphragm and said connector in assembled relationship, an axially extending flange on said diaphragm connector, said flange on said second end plate being received within said flange on said connector and contacting said connector, fingers on said connector flange gripping said second end plate on the side of said plate adjacent said bellows, said upper case assembly comprising a generally cup-shaped case and a hollow nipple fixed to the base of said case and extending outwardly therefrom, an axially extending flange on said upper case adapted to receive said upstanding flange on said lower case, said diaphragm having a rim thereof disposed between said lower case flange and said upper case, said upper case rim being crimped over said lower case flange to retain said diaphragm and upper case in assembled relationship on said lower case, said upper case and diaphragm assembly forming a second chamber adapted to be connected to a source of variable vacuum, a spring seat in said second chamber, a calibrating spring in said second chamber having one end seated upon said diaphragm protector and a second end seated upon said spring seat, screw threads on the internal surface of said hollow nipple, calibrating screw in said hollow nipple having threads mating with said nipple threads, a hollow boss formed on said spring seat, said screw having a portion extending into said hollow boss and a shoulder contacting said spring seat, said screw being adjustable to vary the effective force of said calibrating spring on said diaphragm protector, and a passage through said screw whereby said second chamber may be connected to a source of variable vacuum.

References Cited by the Examiner

UNITED STATES PATENTS

| | | | |
|---|---|---|---|
| 2,646,781 | 7/1953 | Doyen | 92—84 X |
| 3,040,529 | 6/1962 | Hurtle | 92—36 |
| 3,128,751 | 4/1964 | Dahl et al. | 123—140.3 |

EDGAR W. GEOGHEGAN, *Primary Examiner.*

I. C. COHEN, *Assistant Examiner.*